(12) United States Patent
Lertora et al.

(10) Patent No.: US 7,886,168 B2
(45) Date of Patent: Feb. 8, 2011

(54) DEVICE FOR DETECTING IMPACTS OR VIBRATIONS

(75) Inventors: Francesco Lertora, Chiavari (IT); Daniele Grosso, Genoa (IT); Giuseppe Oriana, Genoa (IT)

(73) Assignee: Montalbano Technology S.p.A., Pistoia (PT) (IT)

(*) Notice: Subject to any disclaimer, the term of this patent is extended or adjusted under 35 U.S.C. 154(b) by 740 days.

(21) Appl. No.: 11/856,018

(22) Filed: Sep. 15, 2007

(65) Prior Publication Data
US 2008/0072082 A1    Mar. 20, 2008

(30) Foreign Application Priority Data
Sep. 15, 2006    (IT) .......................... GE2006A0091

(51) Int. Cl.
*G06F 1/26* (2006.01)
*G06F 1/32* (2006.01)

(52) U.S. Cl. ........................ 713/320; 713/300; 713/323; 713/324; 702/141; 600/587; 340/500

(58) Field of Classification Search .................. 713/300, 713/320, 323, 324; 600/587; 340/500; 702/141
See application file for complete search history.

(56) References Cited

U.S. PATENT DOCUMENTS

| | | | |
|---|---|---|---|
| 2003/0149349 A1* | 8/2003 | Jensen | 600/372 |
| 2006/0161377 A1* | 7/2006 | Rakkola et al. | 702/141 |
| 2007/0162238 A1* | 7/2007 | Jeansonne et al. | 702/41 |
| 2007/0279203 A1* | 12/2007 | Thomas et al. | 340/447 |
| 2008/0291006 A1* | 11/2008 | Kang et al. | 340/539.1 |
| 2009/0048538 A1* | 2/2009 | Levine et al. | 600/587 |

* cited by examiner

*Primary Examiner*—Vincent T Tran
(74) *Attorney, Agent, or Firm*—Matthias Scholl, PC; Matthias Scholl

(57) ABSTRACT

Taught is a detection device for detecting impacts and the like, comprising an integrated microcontroller (1) which includes an RFID interface (101) and a non-volatile memory (201), the integrated microcontroller (1) being interfaced with at least one suitable sensing means (2) through a suitable digital interface (102), the integrated microcontroller (1) being provided with a power management logic (301) to manage operation modes of the detection device, power consumption of the sensing means (2) being managed by the power management logic (301).

2 Claims, 3 Drawing Sheets

DEVICE FOR DETECTING IMPACTS OR VIBRATIONS

CROSS-REFERENCE TO RELATED APPLICATIONS

This application claims priority to Italian Patent Application No. GE2006A000091, filed Sep. 15, 2006, the contents of which are incorporated herein by reference.

BACKGROUND OF THE INVENTION

1. Field of the Invention

The present invention relates to devices for detecting impacts, vibrations and the like, and particularly it relates to a device intended to be attached to articles to be transported or otherwise moved; more particularly, the invention relates to a device wherein one or more suitable sensors are interfaced with an RFID (Radio Frequency Identification) unit.

2. Description of the Prior Art

Devices for detecting impacts or the like, which comprise sensing means interfaced with a processor and reporting means by which the occurrence of a detected event is communicated, are known in the state of the art. A first problem with this type of devices is how data can be made available to the operator. Another problem is represented by the type of data sampling to be carried out, which has to provide an adaptive answer for different transport or movement requirements while preserving operation efficiency of the device for the whole time during which the same is attached to a given article.

Accordingly, the aim of the present invention is to provide a device for detecting impacts and the like, said device being able on one hand to communicate gathered data to an operator, and to achieve a collection of significant data even over a quite long time period on the other hand. To this end, it was investigated the possibility of integrating a processor-coupled RFID device with means for detecting impacts, mechanical stress and vibrations.

SUMMARY OF THE INVENTION

Thus, an object of the present invention is a detection device for detecting impacts and the like, comprising an integrated microcontroller which includes an RFID interface and a non-volatile memory, said integrated microcontroller being interfaced with at least one suitable sensing means through a suitable digital interface, said integrated micro-controller being provided with a power management logic able to manage operation modes of said detection device, power consumption of said sensing means being managed by said power management logic.

In a preferred embodiment, said sensing means is a three-axis accelerometer; preferably, such sensing means is provided with memory registers storing the detected data. Sensing means can work in a continuous sampling mode, at given time frames and over preset time periods. Furthermore, it can be possible to set threshold values which are programmable in suitable memory registers, and sensing means doesn't carry out any logging activity below these threshold values.

Another object of the present invention is a method for detecting impacts and/or mechanical stresses, which method can comprise the step of detecting data sensed by sensing means in a substantially continuous manner, said detection being carried out in programmable time frames. Alternatively, detection can comprise gathering data relative to the last event which exceeds a previously assigned threshold value, said detection being carried out in programmable time frames.

BRIEF DESCRIPTION OF THE DRAWINGS

Other advantages and features of the device and method according to the present invention will be apparent from the following description of an embodiment thereof, which is provided by way of illustration, and not by way of limitation, with reference to the accompanying drawings, wherein.

DESCRIPTION OF THE PREFERRED EMBODIMENT

Figure 1:
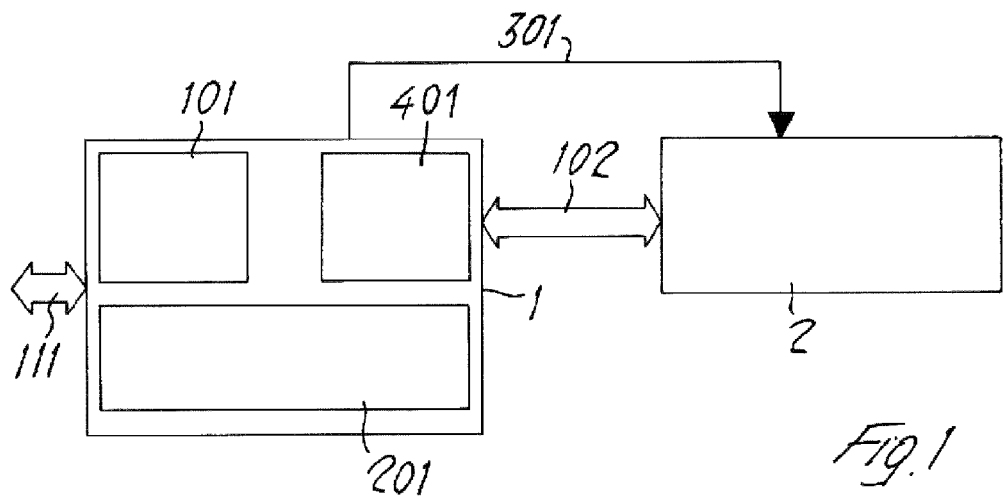
FIG. 1 is a block schematic diagram illustrating the configuration of an embodiment of the device according to the invention.

FIG. 1 illustrates an embodiment of the device according to the present invention; reference numeral 1 denotes a micro-controller having an RF interface 101, a non-volatile memory 201 integrated therein and a Real Time Clock Module 401 able to control and to manage the time by using embedded resources (internal oscillator) or external references (external oscillator or quartz modules). The selection between the time reference resources is programmable by the micro-controller.

The micro-controller can communicate with external devices through a special antenna interface 111 which enables communication with an operator provided with an RFID controller unit, and through a digital interface 102 which places the micro-controller in communication with sensing means 2, such as a 3-axis accelerometer, whose features will be better described below. Power 301 of sensing means is managed by microprocessor 1.

Figure 2:
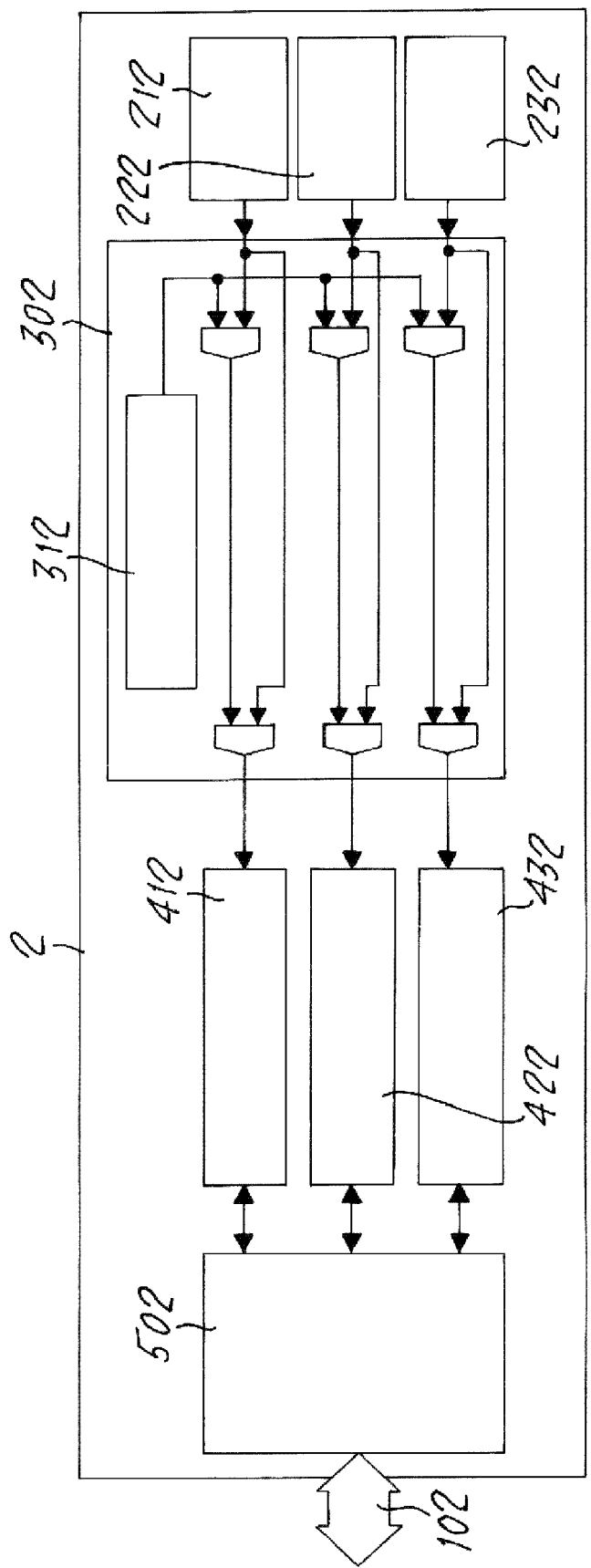
FIG. 2 is a block schematic diagram depicting the configuration of the acceleration sensor used in the embodiment of FIG. 1.

FIG. 2 illustrates the configuration of accelerometer 2 in detail; it comprises 3 sensors 212, 222 and 232, which detect events on each of the axes respectively. Each sensor is connected to a controller 302 provided with a register 312 in which signal threshold values are stored. These threshold values are determined by and depend on the characteristics of the transport and of the product to be transported. Detected data are transferred from controller 302 to memory logs 412, 422 and 432, and than to I/O interface 502, which communicates with a digital interface 102 connected to microcontroller 1.

Management logic of sensor 302 is such to be able to write a value in memory registers 412, 422 and 432. This value can be either a direct value continuously read by acceleration sensors 212, 222 and 232 or the maximum value achieved within a programmable time frame and with a threshold which can be set through the configuration register 312. Microcontroller has the task to decide which mode will be selected, and the selected mode will be set through digital interface 102.

Figure 3:
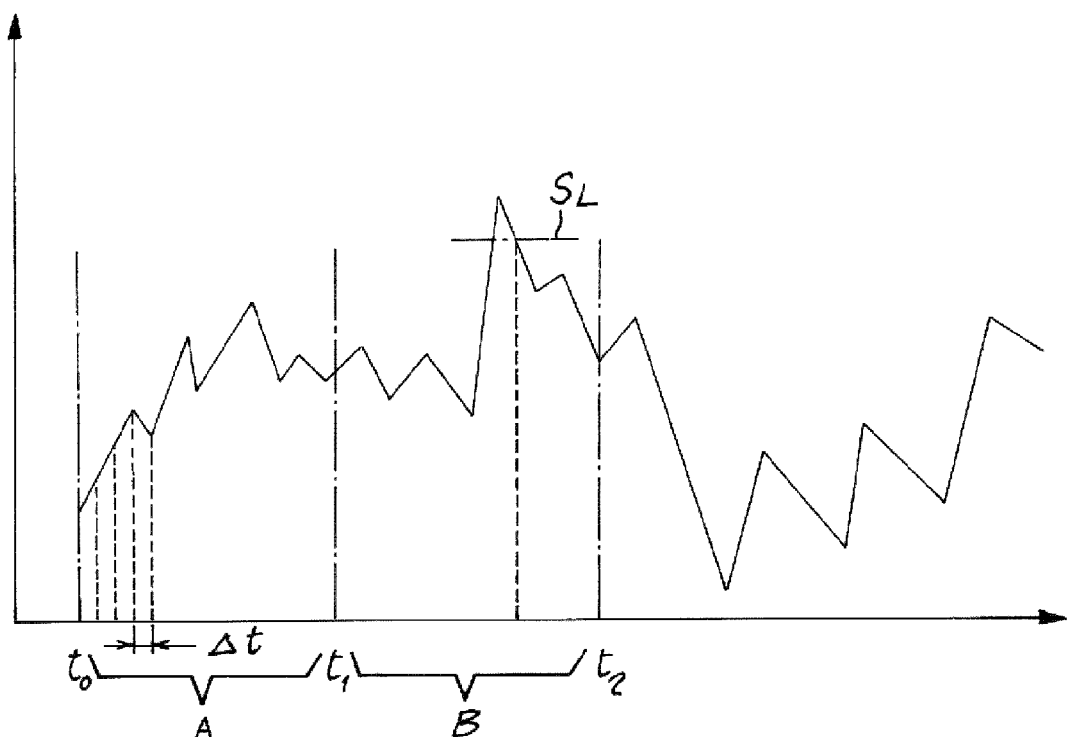
FIG. 3 is a schematic graph showing logged signal versus detection time according to either of two modes described in the present invention.

Operation of the device according to the present invention will become evident from the following, with particular reference to FIG. 3. FIG. 3 illustrates a diagram showing time on x-axis, and signal detected by accelerometer 2 on y-axis, as it can be logged in the non-volatile memory 201 of microcontroller 1. This diagram emphasizes two different operation modes; in the case denoted by A, at a given time-point $t_0$, sensing means and micro-controller are activated, and signal values detected by sensing means and sampled within a time frame $\Delta t$, which is small at will and anyway substantially smaller than the activation time frame of sensing means, are stored in the non-volatile memory 201 of microcontroller 1. This type of detection provides a quite accurate accelerometer curve according to sampling rate Δt, and it is preferable when it is necessary to learn the entire history of mechanical stresses encountered by the article provided with the device of the present invention. In this case, threshold values set in the register 312 of controller 302 will be ignored, and system will log substantially all data detected by sensors 212, 222 and 232 during sampling periods. However, despite the accuracy of this type of logging, the above-described mode is not very suitable to monitor impacts for a given article in a large time frame because of the limited non-volatile memory resources of the microcontroller, and because of the power consumption of the microcontroller itself, which could be powered by battery packs for example.

In the other type of sampling, at time-point $t_1$, microcontroller 1 enters a power saving mode during a programmable time frame $t_2$–$t_1$. However, during the time frame ranging from $t_1$ to $t_2$, sensing means 2 is activated and it is programmed to store the last acceleration breach in its memory registers 412, 422 and 432, the acceleration breach having been previously set in the threshold log 312. At time point $t_2$, microcontroller 1 will automatically exit the power saving mode, it will read memory logs 412, 422 and 432 of accelerometer sensing means 2, it will verify if an acceleration breach has occurred during time frame $t_2$–$t_1$ and, if this is the case, it will log the event in its non-volatile memory 201. The acceleration breach event will be recorded saving the time information $t_2$ together with the acceleration samples coming from the 412-422-432 registers. It is clear that the recording data will be as much as accurate as the less the $t_2$–$t_1$ time is. At the final destination of a given good on which the device described on this invention has been applied it will be possible to know not only if a specific mechanical "shock" happened and when but also its direction and intensity.

Of course, this type of sampling appears more suitable than the first type described when it is desirable to monitor an article over very long time periods and when it is possible to limit analysis to major events, thus saving device power over a substantially longer time period than the first type of sampling. These two operation modes for the device can be used either as an alternative to each other or jointly, according to the type of information that the operator wants to obtain.

In any case, management of power consumption for sensing means is totally programmable through signal 301. Microcontroller can decide if sensing means should not be powered while it is in power-saving mode, or if sensing means should be continuously powered. Of course, if microcontroller doesn't provide power to sensing means, sensing means cannot acquire acceleration data.

Figure 4:
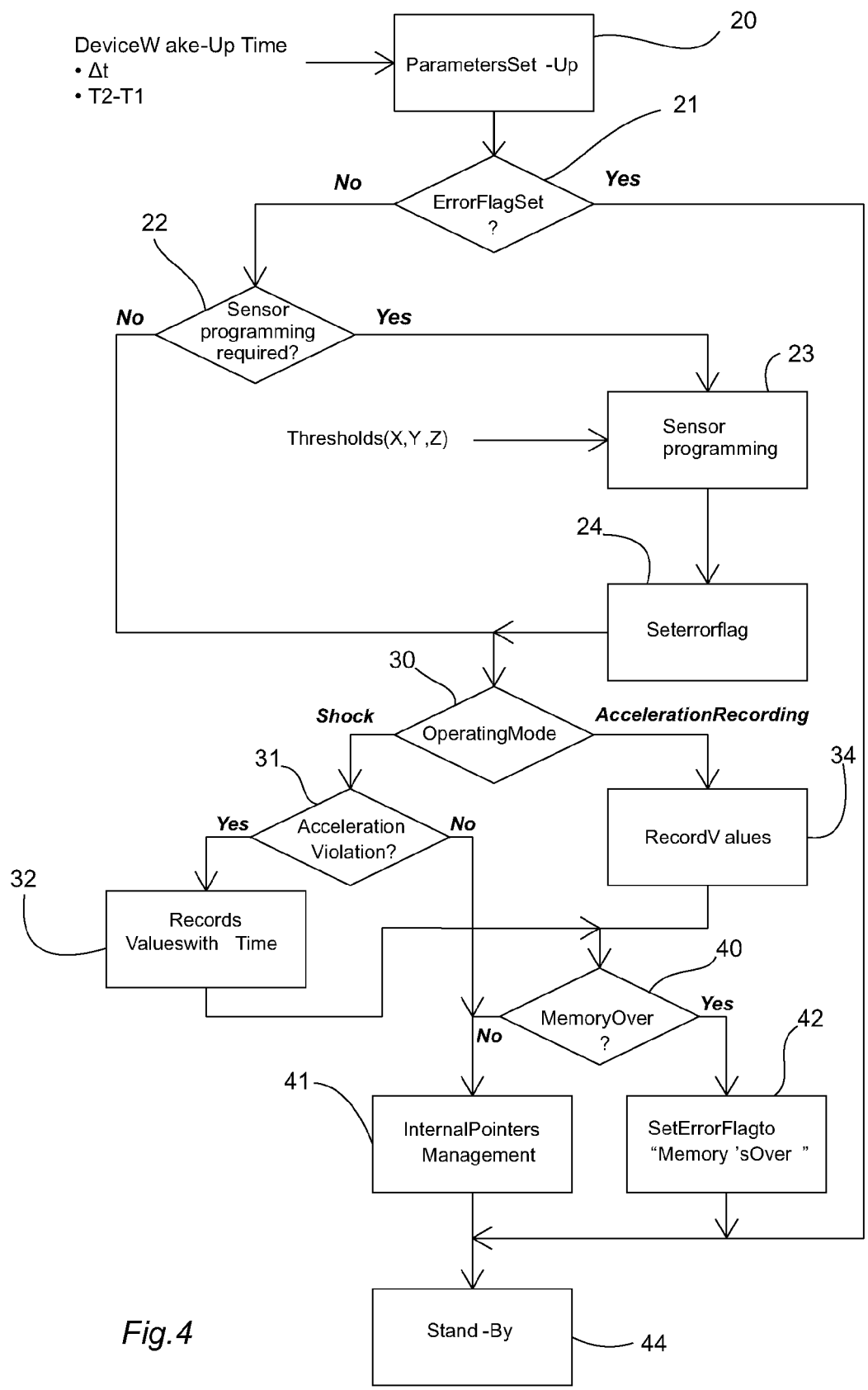
FIG. 4 is a flow chart describing the preferred embodiment of the software algorithm stored and executed by the device microcontroller (device firmware).

FIG. 4 illustrates the preferred embodiment of the firmware stored and running inside the device microcontroller. This algorithm will be executed at every programmed activation period (that can be set-up by a specific RF command). Another RF command can be used also to avoid the accelerometer sensor programming at every wake-up time. After the set-up of the parameters of the device in step 20, the next step is represented by the check of the presence of an error flag at 21; the error flag is related to the program which set up into the accelerometer sensor, and the threshold values for the sensor are programmed at the first switching on of the device, according to the steps 23 and 24 of the flow chart of FIG. 4. At every subsequent wake up of the device, if the values for the accelerometer correspond to the values required, the procedure goes to the step 30, in which is selected the operating mode.

The device firmware could have both the "Shock" or "Acceleration Recording" logging functionalities or implementing only a single branch. In the case of "shock" recording, the procedure comprise a step 31 in which is verified if the acceleration exceeded the given threshold values; a record is then saved in the memory of the device, containing the time and the value of the violation; the memory is checked at this step 40 for its state. If the memory is over, an error flag is then set as in step 42; if the memory is not over, the in step 41 is carried out the management of the pointers of the memory. In the case of the simple "acceleration recording", as according to step 34, the data retrieved from the sensor are recorded in the memory until the same is over. In both the above discussed cases, the procedure ended up with the stand by step 44, the device being waiting for the next wake-up as set-up in step 20.

The invention claimed is:

1. A method for detecting impacts through a detection device comprising an integrated microcontroller (1) which includes an RFID interface (101) and a non-volatile memory (201), said integrated microcontroller (1) being interfaced with at least one suitable sensing means (2) through a suitable digital interface (102), said integrated microcontroller (1) being provided with a power management logic (301) to manage operation modes of said detection device, the power consumption of said sensing means (2) being managed by said power management logic (301), said method comprising the steps of: acquiring data from said sensing means (2) over a given time frame, storing said data in said non-volatile memory (201) of said integrated microcontroller (1), and setting said integrated microcontroller (1) in a power saving mode, wherein said sensing means comprise three sensors (212, 222, 232) connected to a controller (302) provided with a memory register (312) to store detection threshold values; three memory registers (412, 422, 432) to store detected data and an I/O interface (502) to communicate with said digital interface (102) of said integrated microcontroller (1); and wherein data detecting step comprises detecting data in time frames Δt which are small compared to an activation time frame of said sensing means (2), and logging said data in suitable memory registers (412, 422, 432).

2. A method for detecting impacts and through a detection device comprising an integrated microcontroller (1) which includes an RFID interface (101) and a non-volatile memory (201), said integrated microcontroller (1) being interfaced with at least one suitable sensing means (2) through a suitable digital interface (102), said integrated microcontroller (1) being provided with a power management logic (301) to manage operation modes of said detection device, the power consumption of said sensing means (2) being managed by said power management logic (301), said method comprising the steps of: acquiring data from said sensing means (2) over a given time frame, storing said data in said non-volatile memory (201) of said integrated microcontroller (1), and setting said integrated microcontroller (1) in a power saving mode, wherein said sensing means comprise three sensors (212, 222, 232) connected to a controller (302) provided with a memory register (312) to store detection threshold values; three memory registers (412, 422, 432) to store detected data and an I/O interface (502) to communicate with said digital interface (102) of said integrated microcontroller (1); and wherein data detecting step comprises detecting only data that exceed a threshold value stored and programmed in said memory register (312) of said controller (302), data relative to the major event detected in a given programmable time frame being logged in said memory registers (412, 422, 432).

* * * * *